US006886265B2

(12) United States Patent
Fracheboud et al.

(10) Patent No.: US 6,886,265 B2
(45) Date of Patent: May 3, 2005

(54) TOUCH PROBING DEVICE

(75) Inventors: Maurice Fracheboud, Vionnaz (CH); Jean-Marc Breguet, Lonay (CH); Felix Meli, Bern (CH); Reymond Clavel, Oulens-sous-Echallens (CH)

(73) Assignee: Mercartex SA, Losone (CH)

( * ) Notice: Subject to any disclaimer, the term of this patent is extended or adjusted under 35 U.S.C. 154(b) by 0 days.

(21) Appl. No.: 10/662,604

(22) Filed: Sep. 15, 2003

(65) Prior Publication Data
US 2004/0128847 A1 Jul. 8, 2004

(30) Foreign Application Priority Data
Sep. 18, 2002 (EP) .............................. 02020887

(51) Int. Cl.⁷ .............................. G01B 5/00; G01B 5/012
(52) U.S. Cl. ........................................................ 33/559
(58) Field of Search ........................... 33/503, 504, 556, 33/559

(56) References Cited

U.S. PATENT DOCUMENTS

| | | | |
|---|---|---|---|
| 3,869,799 A | | 3/1975 | Neuer et al. ............... 33/174 L |
| 4,621,434 A | * | 11/1986 | Hirschmann ................. 33/503 |
| 4,835,871 A | * | 6/1989 | Pesikov ....................... 33/503 |
| 4,964,223 A | | 10/1990 | Linder et al. ................. 33/556 |
| 5,005,297 A | | 4/1991 | Aehnelt et al. ............... 33/559 |
| 5,029,398 A | | 7/1991 | Ertl .............................. 33/503 |
| 5,345,690 A | * | 9/1994 | McMurtry et al. ........... 33/559 |
| 5,548,902 A | * | 8/1996 | Ernst ............................ 33/559 |
| 5,712,961 A | * | 1/1998 | Matsuo ........................ 33/559 |
| 5,884,410 A | * | 3/1999 | Prinz ............................ 33/559 |
| 5,887,356 A | * | 3/1999 | Sheldon ....................... 33/556 |
| 6,453,566 B1 | | 9/2002 | Bottinelli et al. ............ 33/1 M |

FOREIGN PATENT DOCUMENTS

| | | |
|---|---|---|
| DE | 37 15 698 A1 | 12/1988 |
| EP | 102 744 B1 | 3/1984 |
| EP | 1 013 949 A1 | 6/2000 |
| EP | 1 113 191 A2 | 7/2001 |

OTHER PUBLICATIONS

"Accuracy Limitations of Fast Mechanical Probing", van Vliet et al., Eindhoven University of Technology, Section Precision Engineering, Eindhoven, The Netherlands, Jan. 8, 1996, pp. 483–487.

"Development of a 2D Probing System With Nanometer Resolution", Pril et al., Eindhoven University of Technology, Eindhoven, The Netherlands, American Society for Precision Engineering, Proceedings vol. 16, 1997, pp. 438–442.

"Design for a Compact High–Accuracy CMM", Peggs et al., Center for Length Metrology, National Physical Laboratory, Teddington, Middlesex, UK, Jan. 8, 1999, pp. 417–420.

European Search Report in EP 02 020 887.2 dated Mar. 17, 2003.

* cited by examiner

Primary Examiner—G. Bradley Bennett
(74) Attorney, Agent, or Firm—Marshall, Gerstein & Borun LLP

(57) ABSTRACT

The invention is directed to a touch probing device for inspecting an object which includes a fixed part, movable part coupled to and movable with respect to the fixed part for measuring the motion between the fixed and the movable parts, and a contact means coupled to the movable part for contacting a surface of the object. The contact means is preferably coupled to the movable part via a shock absorber. Alternatively, or in addition weight compensating means are provided for compensating the weight of the movable part. The weight compensating means preferably uses a magnetic field for compensating the weight of the movable part.

28 Claims, 10 Drawing Sheets

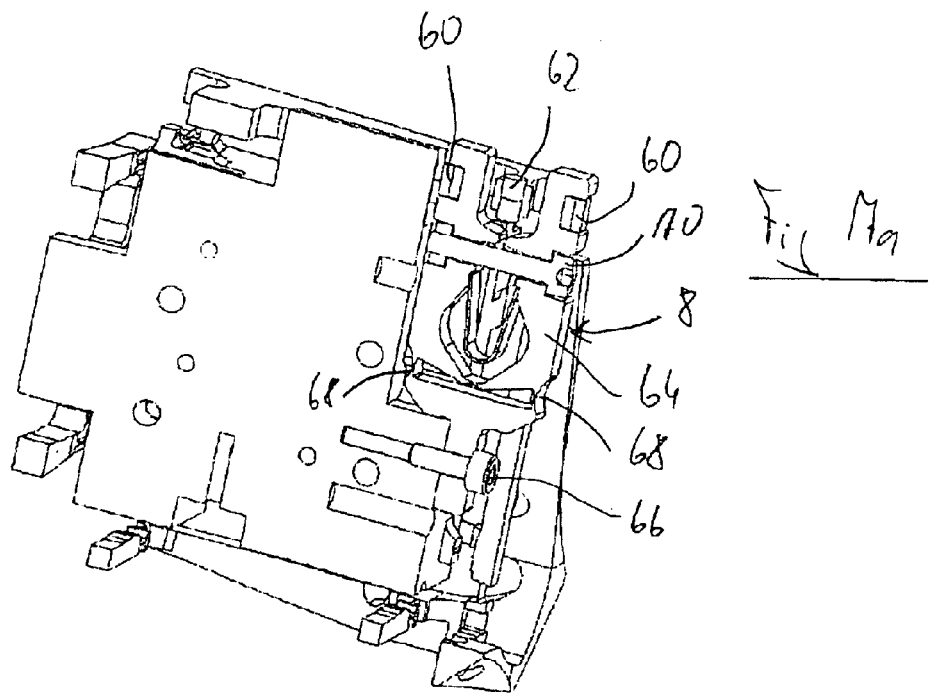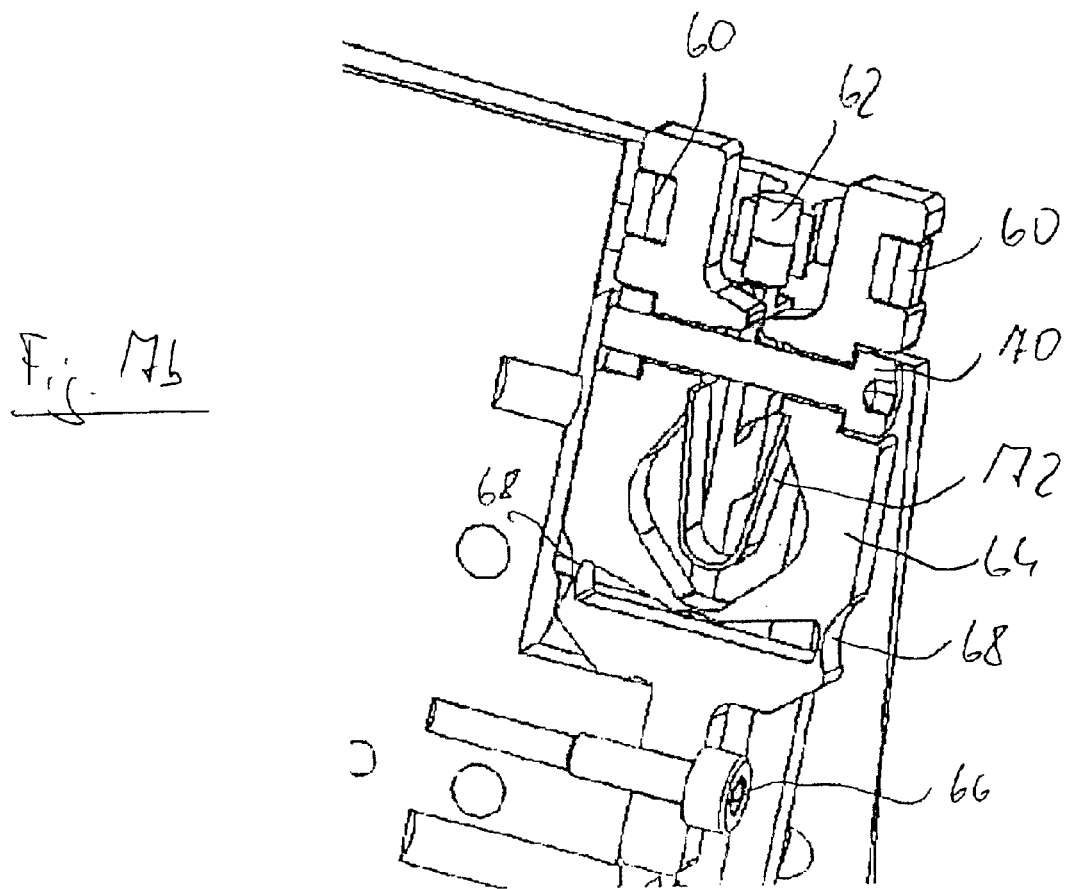

Without shock absorber

With shock absorber

TOUCH PROBING DEVICE

FIELD OF THE INVENTION

The invention relates in general to a touch probing device, such as used with coordinate measuring machines, and in particular to a low-force touch probing device.

DESCRIPTION OF PRIOR ART

The general miniaturization of ever more complex products has lead to an increased importance of high precision machining and assembly. As a result, sub-micrometry accuracy is often required, especially in the field of micro- and opto-electronics, and this trend is also seen in many other fields. This tendency is followed by a demand for ever more powerful geometric inspection equipment. In order to comply with the requested quality standards, the geometric inspection equipment shall be an order of magnitude more accurate than the object to be inspected.

A particular role in geometrical inspection is held by coordinate measuring machines (CMM), because of the possibility to measure complex three-dimensional objects. A CMM typically comprises an arm to which a touch probing device is mounted, and which is movable in three dimensions relative to a table on which the object to be inspected is supported. The capabilities of a CMM strongly depend on the proprieties of this touch probing device. The touch probing constitutes the real heart of the CMM. A variety of touch probing devices have been developed. Various types of constitutions and sensor technologies have been employed in order to improve probing speed and accuracy, and avoid damages on the touch probing device and on the object to be inspected.

A particular construction of a known touch probing device for sensing the position of an object is disclosed in EP 0 102 744 which includes a fixed member and a movable member bearing a stylus, that movable member being coupled to the fixed member by means of three motion transmission units. The three units are functionally coupled in parallel and arranged in such as to limit the motion of said movable member to three translation degrees of freedom (dof). In comparison with three units which are functionally coupled in series, the load exerted onto the units is more uniformly distributed among the three parallel units, the stiffness beyond the permitted translation degrees of freedom is hereby much higher, and it allows for a very compact construction. Flexural elements are used instead of sliding joints or rollers as swiveling connections between the movable and fixed members.

The Ecole Polytechnique Fédérale Lausanne and its Laboratoire de Systèmes Robotiques (LSRO) has accomplished profound studies on the improvement of flexural articulations, in particular in the context of parallel kinematics. Examples of these improvements are disclosed in EP 1 013 949 and EP 1 113 191. The latter document discloses a motion transmission apparatus for the transmission of three input-side motion components with one motion dof, respectively, into an output-side motion with three motion dof, or vice versa. Three transmission units, each including one input section and one output section, are functionally coupled to each another in parallel via their output sections. The transmission units are composed of parallelograms with flexural articulations which are designed as thin, circular shaped bend linkages.

One problem in mechanical touch probing is the limited allowable probing force between the stylus tip and the object to be inspected. The probing force is composed of a static component and a dynamic component. The static force is due to the small overtravel and the consequential probe deflection. The collision between stylus tip and the object to be inspected causes dynamic forces due to the inertia of the probe. Thus, the dynamic force depends essentially on the approach speed, the probe mass, probe size (sphere diameter) and the elasticity of the impact.

Extensive studies thereof where made at the Eindhoven University of Technology and its precision Engineering Section. The following publications give a detailed insight regarding the mechanics of the probing process:

"Design for a compact high-accuracy CMM", G. N. Peggs, A. J. Lewis, S. Oldfield, Center for length metrology, National Physical Laboratory, Teddington, Middlesex, UK, 8 Jan. 1999

"Accuracy limitations of fast mechanical probing", W. P. van Vliet, P. H. J. Schellekens, Eindhoven University of Technology, Eindhoven, The Netherlands, Annals of the CIRP, Vol 45/1/1996

"Development of a 2D probing system with nanometer resolution", W. O. Pril, K. G. Struk, P. H. J. Schellekens, Eindhoven University of Technology, Eindhoven, The Netherlands, American society for Precision Engineering, 1997 Proceedings As denoted introductorily, the inspection requirements are becoming more and more demanding and the objects to be inspected feature increasingly smaller, fragile details. Accordingly, the stylus, in particular the stylus spheres to be applied for the inspection, must have a very small diameter. However, the use of smaller probing styli raises the stress at the contact point. Further, in case of objects having low Young's modulus, excessive or permanent deformation may occur. In order to make accurate measurements with small probing spheres on the probing surface, the static and dynamic probing forces need to be very small. The existing touch probing devices lack in particular in this last point, which is essential for the accurate non destructive inspection of smallest sized parts.

U.S. Pat. No. 5,029,398 and EP 0 102 744 B1 show touch probing devices comprising a weight compensating means which use a tension spring and a buoyancy floating in a liquid, respectively, for compensating the weight of the movable part of the touch probing device, including the stylus.

SUMMARY OF THE INVENTION

The invention provides an extremely accurate and reliable mechanical touch probing device.

In one embodiment, the touch probing device includes a fixed part and a movable part coupled to and movable with respect to the fixed part, and further includes means for measuring the motion between the fixed and the movable parts and a contact means coupled to the movable part for contacting a surface of an object to be inspected. The contact means is coupled to the movable part via a shock absorber. Advantageously, the inventive touch probing device does not affect the surface of the object to be inspected, while permitting acceptable measurement speed.

According to a second embodiment of the invention, the touch probing device comprises a fixed part and a movable part coupled to and movable with respect to the fixed part, and further includes a means for measuring the motion between the fixed and the movable parts and a contact means coupled to the movable part for contacting a surface of the object. It further comprises a weight compensating means, which preferably uses a magnetic field for compensating the weight of the movable part.

BRIEF DESCRIPTION OF THE DRAWINGS

The preferred embodiments will now be described with reference to the accompanying drawings, wherein:

FIG. 7a is a cross-sectional view of a permanent magnet weight compensating unit within a motion transmission unit of the motion transmission assembly, FIG. 7b is an enlarged fragmentary cross-sectional view of the permanent magnet weight compensating unit shown in FIG. 7a, FIGS. 8a,c are cross-sectional views of the permanent magnet weight compensating unit in a first and second adjusting position, respectively.

DESCRIPTION OF PREFERRED EMBODIMENTS

Figure 1:
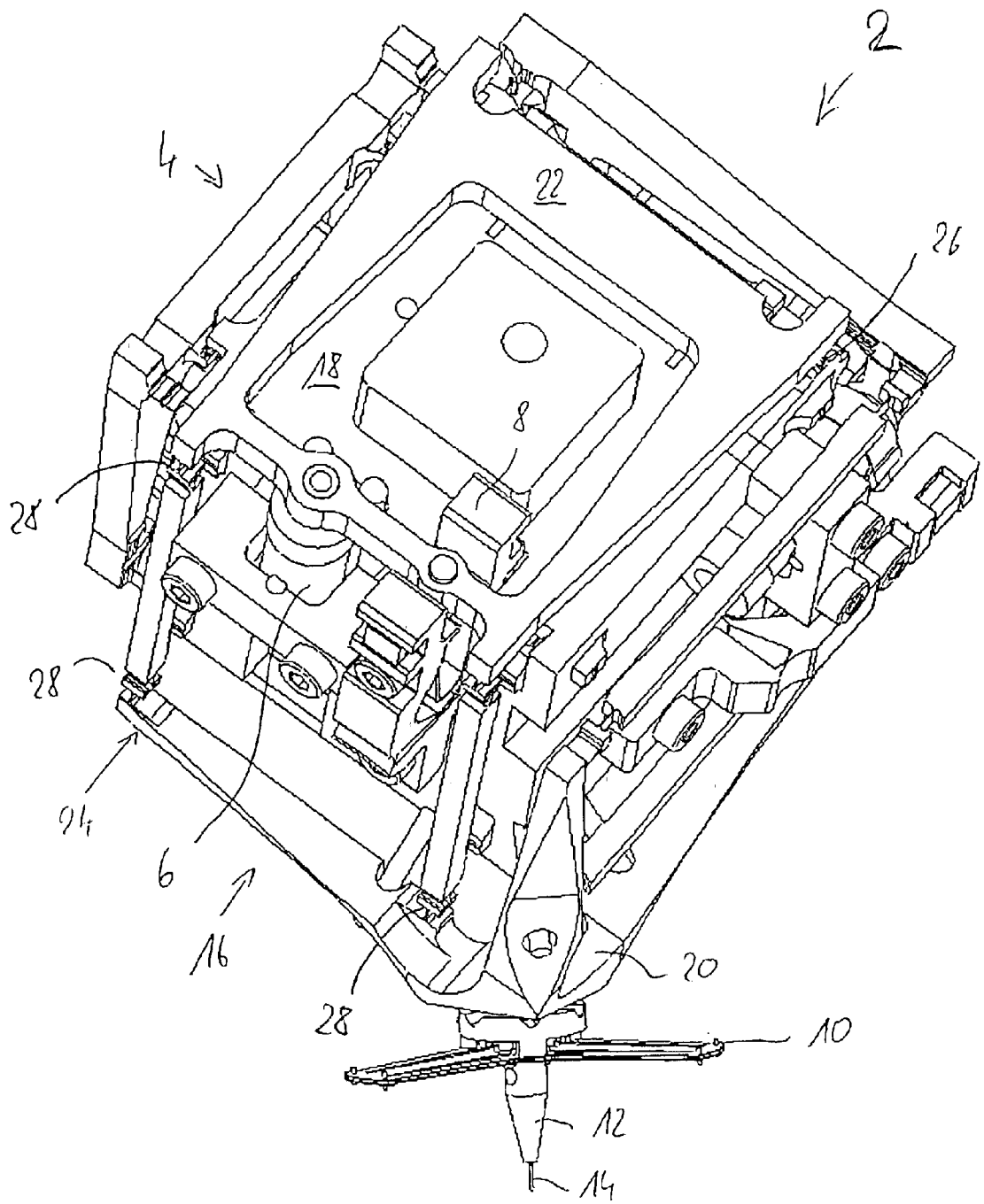
FIG. 1 is an isometric view of a complete touch probe apparatus according to a first embodiment of the invention.

Referring to FIG. 1, there is shown a mechanical touch probe device, generally designated 2, comprising a parallel kinematics motion transmission assembly 4 with integrated position transducers 6 and weight compensating units 8. The touch probe device 2 further includes a shock absorber 10 and a stylus carrier 12 with a stylus 14. It is attached to the ram of a CMM (not shown).

The parallel kinematics motion transmission assembly 4 is constituted by three motion transmission units 16, wherein each transmission unit 16 is designed such as to permit three translation dof (wherein the excursion according to one of the three translation dof is measured by the associated transducer) and to prevent one rotation dof. The three transmission units have a similar construction and are arranged in different planes, which are preferably mutually orthogonal to each other, such as to prevent, for the assembly, all three rotation dof and to permit all three translation dof. In FIG. 1, the touch probe device 2 is shown in its preferred biased position, with the planes of all motion transmission units 16 inclined with respect to the vertical axis, such that all units 16 are affected equally by gravity and by displacing forces transverse to the vertical axis.

Figure 2:
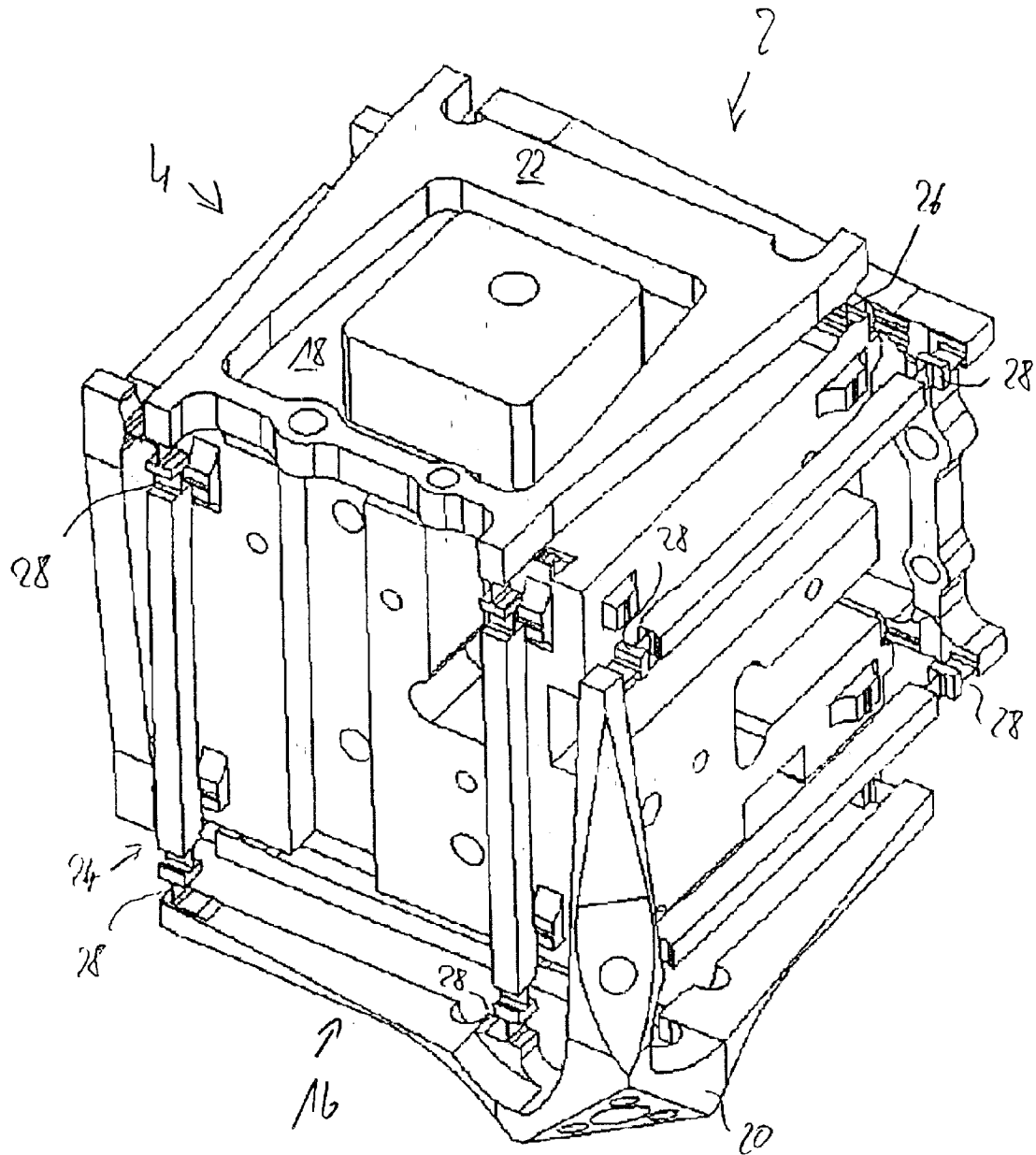
FIG. 2 is an isometric view of a motion transmission assembly of the touch probe apparatus in FIG. 1.
Figure 3:
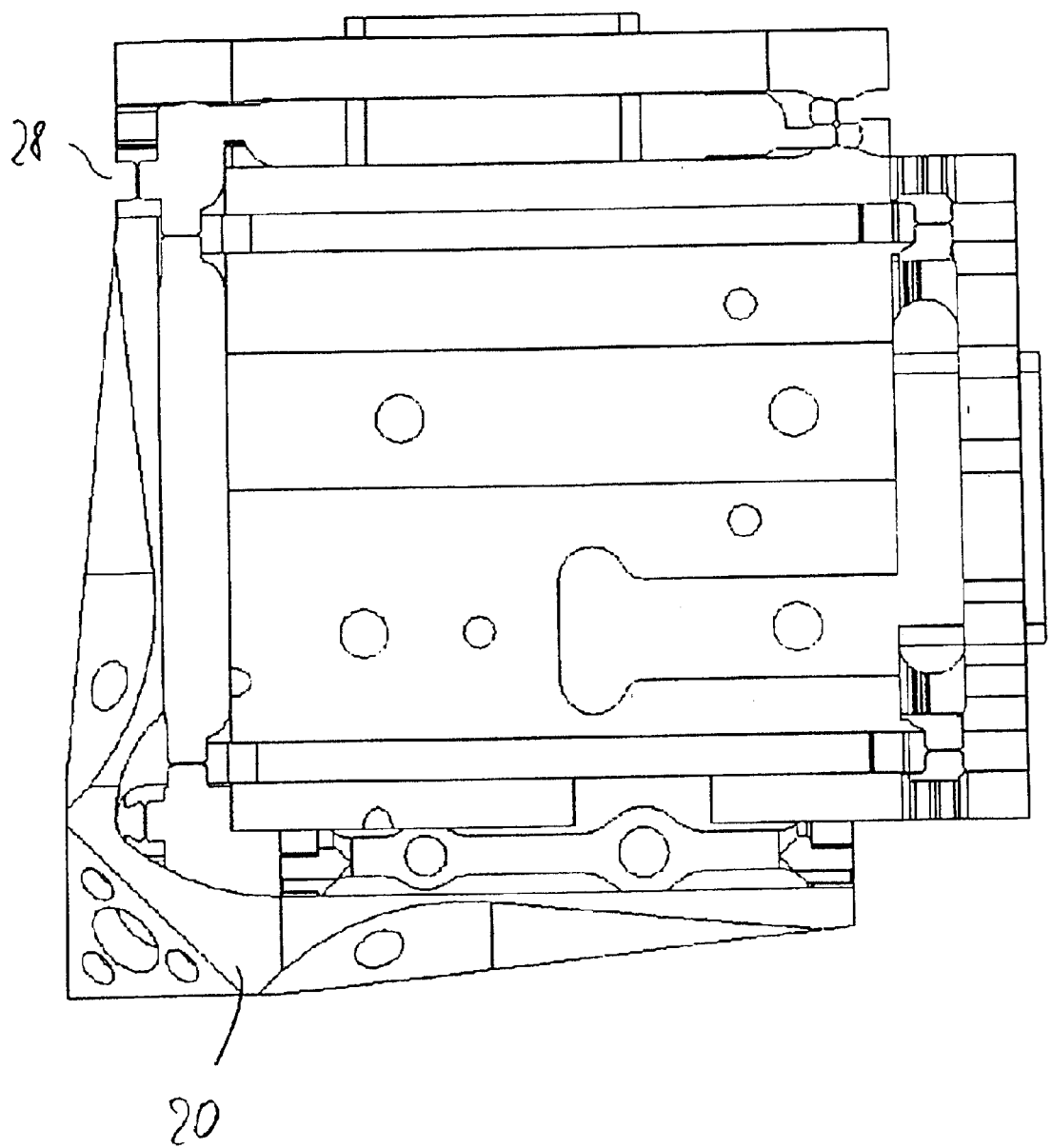
FIG. 3 is a plan view of FIG. 2.

A preferred design of such a parallel kinematics motion transmission assembly 4 is shown in FIGS. 1 and 2. The assembly 4 includes a common fixed part 18, a common movable part 20, and the three motion transmission units 16. The motion transmission units 16 are connected between the respective parts 18, 20 independently of the other units 16 so that the units 16 may be said to be connected "in a functionally parallel manner" between the parts 18 and 20. Each transmission unit 16 includes a plate-like part 22 and a parallelogram part 24. The plate-like part 22 is linked at one of its functional ends via a flexural link 26 to the fixed part 18. More precisely, the functional end is constituted by one of the four edges of the plate-like part 22, whereas two flexural links 26 at each of the two corners of said edge couple the plate-like part 22 to the fixed part 18. The interior of the plate-like part 22 has a nearly square-like recess in order to allow access to the interior of the touch probe device 2 and to reduce weight of its movable mass. The opposite functional end of the plate-like part 22 is linked via the parallelogram part 24 to the common movable part 20. The plate and parallelogram parts 22, 24 are arranged in different planes, which are preferably orthogonal to each other. The arms of the parallelogram part 24 are linked by means of flexural links 28 (compare the detailed discussion below).

An alternative design of the parallel kinematics motion transmission assembly is shown in EP 1 113 191, the entire disclosure of which is incorporated by reference herein. Similarly, the assembly includes a common fixed part, a common movable part, and three transmission units being connected between the respective parts in a functionally parallel manner. In contrast to the assembly 4 shown in FIGS. 1 and 2, each transmission unit has a first parallelogram part linked to the common fixed part, an intermediate L-shaped part, and a second parallelogram part which extends in a transverse direction with respect to the first parallelogram part. The second parallelogram part is linked with its one functional end to the intermediate L-shaped part and with its other functional end to the common movable part. The first and second parallelogram parts and the L-shaped part of one unit are all lying in the same plane. Again, the movable links between the components are built as flexural links.

Each of the flexural links 26 permits a swiveling motion in just one direction, whereas each of the flexural links 28 permit a swiveling motion in two, preferably orthogonal directions. The outer shape of the flexural links 26 and 28 is preferably circular or prismatic such that a thin residual section remains at the center of each link 26 and 28. Preferably, the flexural links and the components linked by those are manufactured from one common piece of material. In order to allow the flexural links 28 to swivel into the two directions, double flexural links are used which are coupled in series: a first flexural link permitting a swiveling motion in a first direction, a small load apportioning means and a second flexural link permitting a swiveling motion in a second direction, wherein the first and second flexural links are coupled to each other such that the first and second directions are preferably orthogonal to each other.

Further details regarding the construction of the circular shaped flexural links, especially in connection with their fabrication by an electroerosion process, are disclosed in the following publications the disclosures of which are incorporated by reference herein:

"Fatigue failure of thin wire electrodischarge machined flexible hinges" by S. Henein, C. Aymon, S. Bottinelli and R. Clavel, Procedures of SPIE Symposium on Intelligent Systems for Advanced Manufacturing, Boston, Mass., USA, Sep. 19–22, 1999.

"Conception de structures articulées à guidages flexibles de haute précision" by S. Henein, Thesis 2000, Lausanne, VD, Switzerland.

The parallel kinematics motion transmission assembly 2 has a typical lateral length of 50 mm. The assembly 2, in particular its motion transmission units 16 are preferably fabricated from a common material block. The monolithic construction improves the stiffness and manufacturing tolerances since assembling inaccuracies will be avoided. However, in case of larger touch probing devices 2 it may be advantageous to manufacture separate motion transmission units 16 and assemble them afterwards. The motion transmission assembly 4 includes an integrated mechanical stroke limitation in order to protect the assembly 4 from overtravel.

The wire electric discharge machining process (WEDM) is particularly suitable for manufacturing the flexural links, because the force between the tool (wire) and the work piece is extremely small allowing the production of very thin and accurate hinge sections. In this case the material should be at least partially electrically conductive. In order to produce a monolithic structure other sections are preferably manufactured by micro electric discharge machining process ($\mu$-EDM) or micro milling process.

The above parallel kinematics motion transmission assembly 2 exhibits all the known advantages of flexural hinges, i.e. absence of friction, very low hysteresis, high wear resistance, absence of mechanical play and immunity against collecting interfering contamination. The transducers 6 are fixed directly to the fixed part 18 of the motion transmission assembly 4. Thereby, the movable mass of the transmission assembly is comparatively low. Further, the biased direction of all three motion transmission units 16 in relation to the vertical axis benefits from identical working conditions for all three transmission units 16. The stiffness of the parallel kinematics motion transmission assembly 4 with the described flexural links 26 and 28 is very low, in the order of 20 mN/mm.

The shock absorber 10 is coupled to the common movable part 20 forming a first movable stage of the motion transmission assembly 4 and forms a second movable stage. The shock absorber 10 has an extremely small mass as compared to the movable mass of the motion transmission assembly 4 and a stiffness along the impact direction of the touch probe device onto the work piece which is preferably two orders of magnitude higher than the stiffness of the parallel kinematics motion transmission assembly in said direction.

Figure 4:
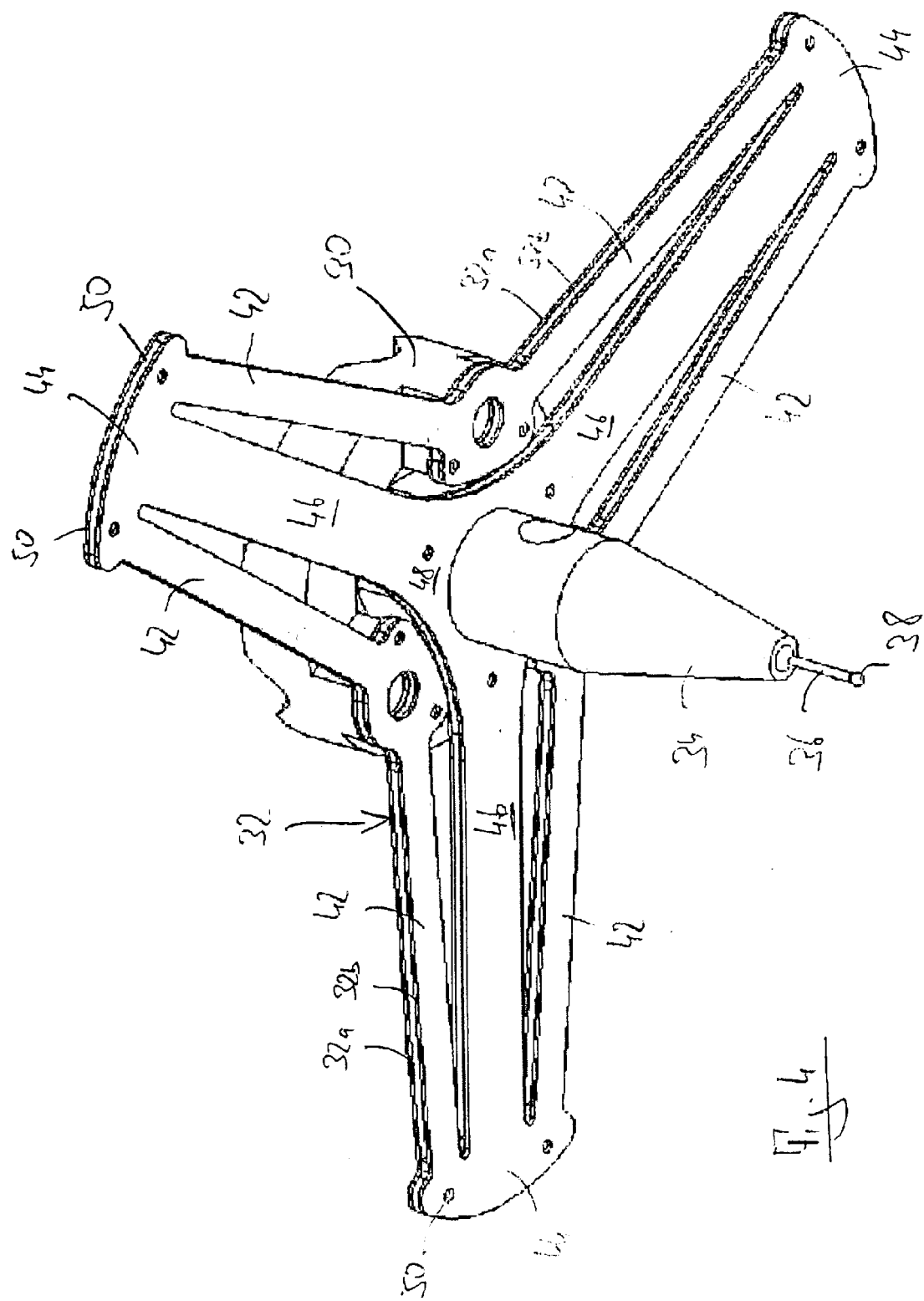
FIG. 4 shows in detail the bottom side of a low impact force 3D-shock absorber of the touch probe apparatus shown in FIG. 1.
Figure 5:
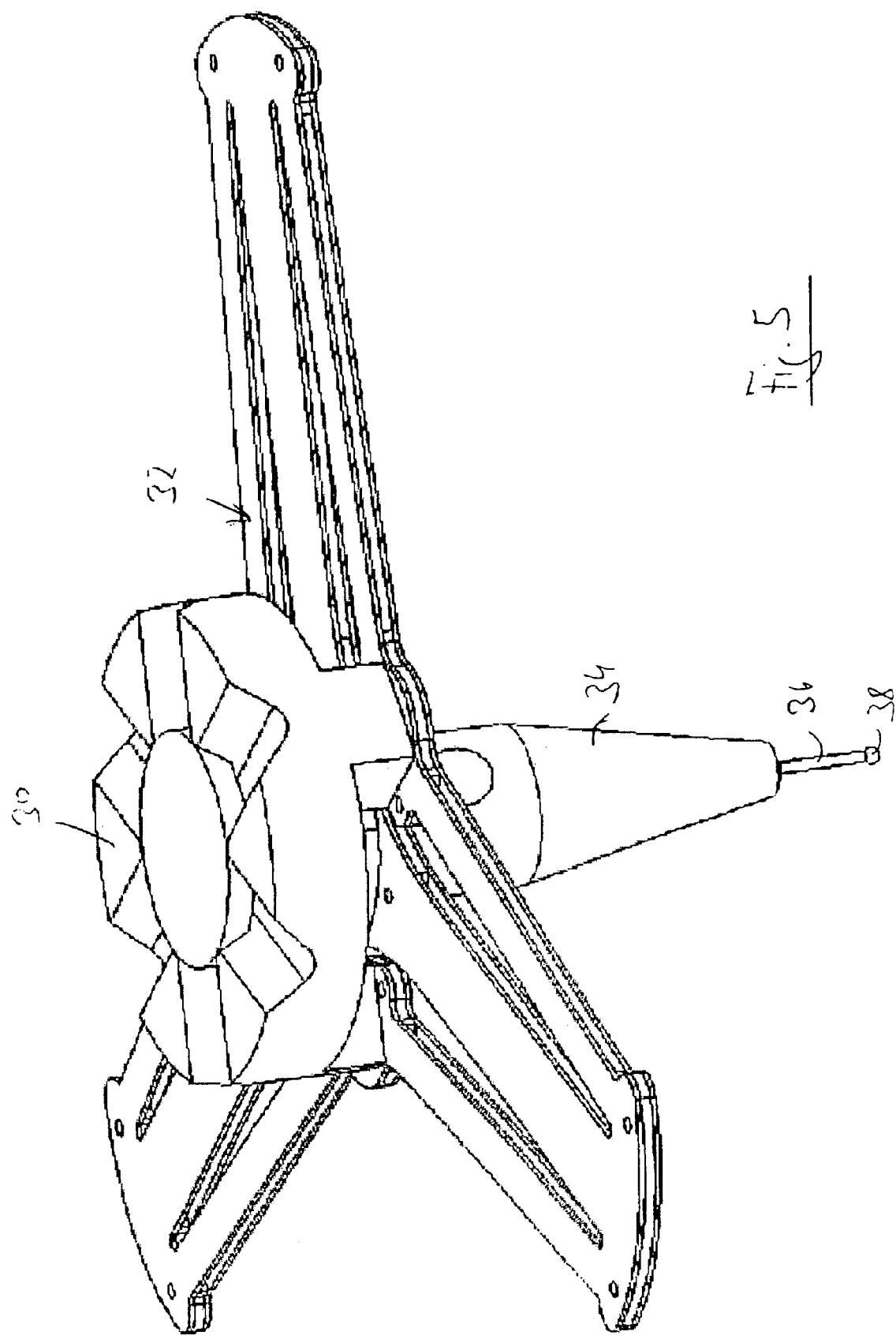
FIG. 5 shows the top side of FIG. 4.

A preferred embodiment of a 3D-shock absorber 10 is shown in detail in FIGS. 4 and 5. The prefix "3D" means an uniform stiffness of the 3D-shock absorber 10 in all three spatial directions. The 3D-shock absorber 10 comprises in series a fixture 30 at its input side which is (detachable) fixed to the common movable part 20, a spring unit 32 which provides the 3D-shock absorber 19 with a predetermined uniform stiffness in all three translation directions and a stylus support 34 at its output side which carries a stylus 36. The stylus 36 has a sphere 38 at its tip for contacting (probing) a work piece (not shown). When probing a work piece such a contact causes a deflection of the measuring chain (including the three functionally parallel motion transmission units 16) and corresponding displacement(s) of the transducer(s) 6 which in turn supply a measuring signal in dependence of the deflection.

According to the preferred embodiment of the 3D-shock absorber shown in FIGS. 4 and 5, which is optimized with respect to the criteria of a lowest possible mass and a uniform stiffness in all three spatial directions, the spring unit 32 is an essentially flat leaf-spring of a thin sheet material. The transverse axis of the leaf-spring 32 corresponds to the stylus axis. The fixture 30 and the leaf-spring 32 are connected at three connecting points 40. From each of these connecting points 40 there are two first leaf-spring sections 42 protruding radially outwardly. Each first leaf-spring section 42 joins an adjacent first leaf-spring section 42 of an adjacent connecting point 40 at an outer section 44 of the leaf-spring 32. From each of the three outer sections 44 a second leaf-spring section extends radially toward the center of the leaf-spring 32. The three second leaf-spring sections join each other at a common inner section 48 which is coupled to the stylus holder 34.

The 3D-shock absorber 10 shown in FIGS. 4 and 5 includes two identical leaf springs 32a,b stacked closely upon each other. The leaf springs 32a,b are spaced apart by means of spacers 50. These spacers 50 connect the leaf springs 32a,b at their extremities, i.e. the three connecting points 40 near the fixture 30, the three outer sections 44, and the inner section 48. The lengths, widths, thickness and materials of the first and second leaf-spring sections 42 and 46 are chosen such that the stiffness of the 3D-shock absorber 10 is equal in its axial (perpendicular to the leaf-spring plane) and its two transverse (parallel to the leaf-spring plane) spatial directions. The leaf-springs 32 are built from a thin flexible sheet material. The sections of the leaf-springs 32 are preferably cut out from a sheet material by laser cutting or punching. The components are joined together by means of screws, rivets, welding, gluing, or the like. Alternatively, there may be only one leaf spring or three or more leaf springs in order to reduce or increase the uniform stiffness of the 3D-shock absorber while maintaining the maximum excursion distance of the leaf-spring into the three spatial directions.

Altogether, the leaf-spring 32 includes three identical sections 42 and 46 which are distributed symmetrically around its center, with an angular offset of 120°. The three functionally parallel leaf-spring sections 42 and 46 have a common input side at its interface to the fixture 30 and a common output side at its interface to the stylus holder 34. The symmetrical design and the optimized dimensioning confers an uniform stiffness in all spatial directions relative to the stylus sphere 38. Alternatively, the 3D-shock absorber 10 may have more than three outwardly protruding first spring-leaf sections 42, symmetrically distributed around its center axis. It may for instance have four such sections with an angular offset of 90°.

Figure 6:
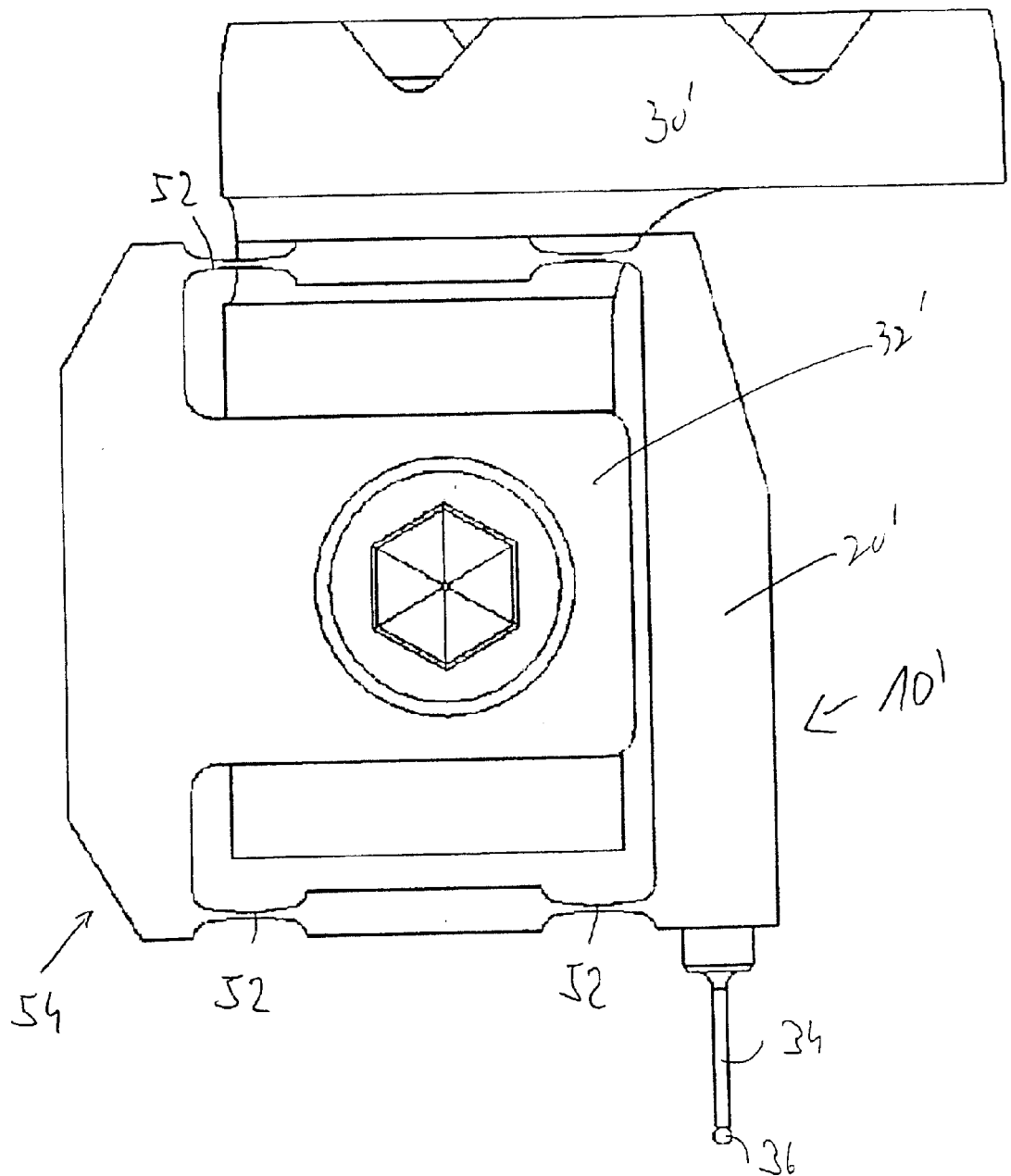
FIG. 6 is a plan view of a low impact force ID-shock absorber.

FIG. 6 shows an alternative ID-shock absorber 10' which exhibits a predetermined stiffness in only one spatial direction, namely along the axial direction of the stylus 36. The ID-shock absorber 10' includes a fixture 30' coupled to the input side of plate-like spring unit 32' having a parallelogram part 54 with flexural articulations (which may be built similar to the flexural links 26 and 28). The output side of the spring unit 32' is coupled to a movable part 20' holding a stylus support 34' which carries a stylus 36. The parallelogram part 54 only allows flexural motion in the axial direction of the stylus 36 and prevents flexural motions in the transverse directions and flexural rotations.

FIGS. 7a, b and 8a, b show a preferred embodiment of the weight compensating units 8 based on the principles of a static magnetic field, i.e. a passive magnetic suspension. A series of permanent magnets are arranged such as to generate a force having about the same value but opposite to the force of gravity of the movable mass of the touch probing device 2. The weight compensating unit 8 includes preferably two permanent magnets, a first magnet 60 being mounted to the fixed part 18 of the motion transmission assembly 4, and a second magnet 62 being mounted on its movable part. Preferably, each one of the three transmission units 16 of the motion transmission assembly 4 has its own weight compensating unit 8. Thereby, the second permanent magnet 62 of the movable part is mounted to its plate-like part 22, which has only one dof.

Figure 8C:
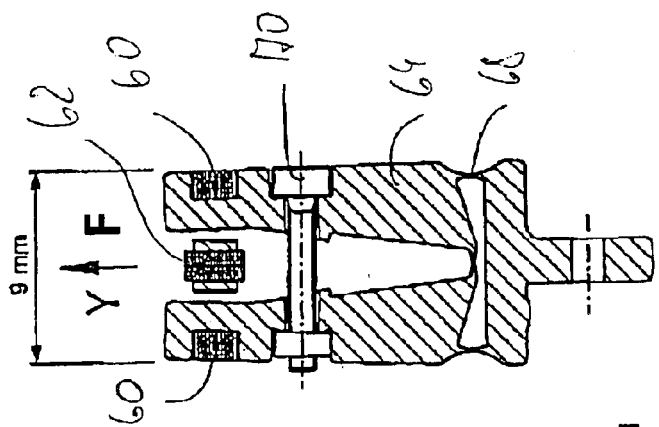
FIG. 8b is a chart representing the force/position relation of the permanent magnet weight compensating unit in the adjusting positions shown in FIGS. 8a and 8c, FIGS. 9a,b are two illustrations of a theoretical model representing the mass and stiffness of relevant touch probe apparatus components, FIGS. 10a,b are charts representing the Hertz-pressure/ approaching speed relations without and with shock absorber, respectively.
Figure 8B:
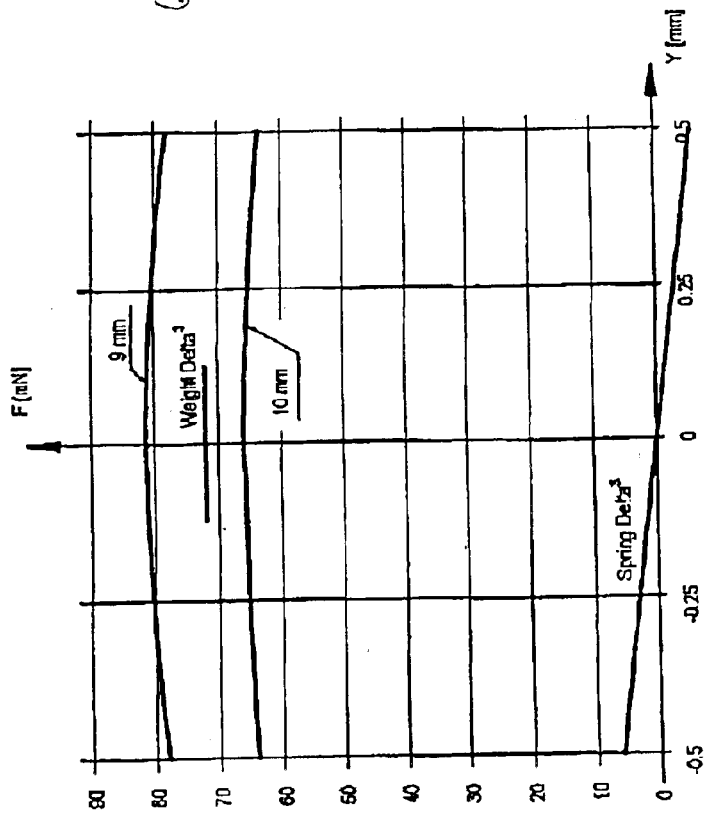
Figure 8A:
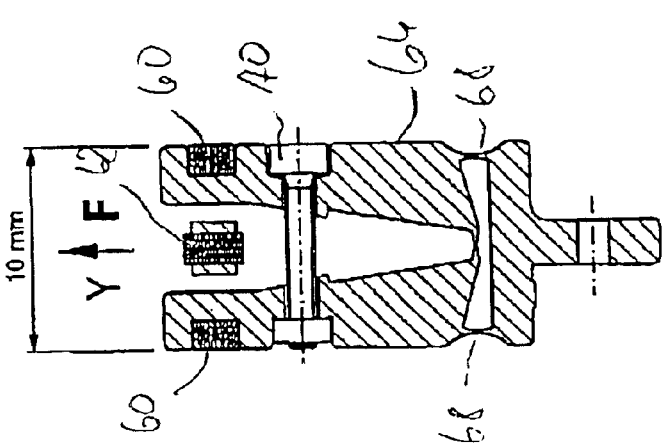

FIGS. 8a and c schematically show the preferred weight compensating unit 8 of FIGS. 7a and b. The weight compensating unit 8 includes a monolithic fork 64 supporting two first permanent magnets 60 on the outer sides of the fork tins, respectively, close to the open upper end of the fork 64. The second permanent magnet 62 mounted to the output side of thee plate-like part 22 of the transmission unit 16 lies between the two fork tine within the aperture of a fork 64 adjacent to the first permanent magnets 60. The lower end of the fork 64 is firmly connected with the fixed part 18 of motion transmission assembly 4 by means of a screw 66. The tine of the fork 64 are coupled to its base via flexural articulations 68 which permit the aperture of the fork 64 (i.e., the distance of the two fork tine) to be adjusted in a certain range by means of an adjustment screw 70. The adjustment screw 70 cooperates with a torsion spring 72 exerting a outwardly directed torsion force onto the fork tine. By tightening the adjustment screw 70 the aperture of the fork 64 is reduced and the magnetic force induced by the first and second permanent magnets 60 and 62 on the movable part is increased. It is herewith possible to adjust the desired weight compensation in a range of about ±30%, according to the weight on the movable part. Furthermore, the weight compensation of each transmission unit 16 can be individually fine adjusted.

In an alternative embodiment (not shown) there is a sole weight compensating unit instead of three. In this case the magnetic suspension is arranged between the fixed part 18 of the motion transmission assembly 4 and its output section at the movable part 20, along the axis of gravity.

FIG. 8b shows a chart representing the force/position relation of the permanent magnet weight compensating unit 8 with a first fork aperture according to FIG. 8a, and a second, smaller fork aperture according to FIG. 8c. As shown, the particular arrangement of the permanent magnets 60 and 62 generates a quasi linear compensating force within the excursion range of the movable part of the transmission unit 16.

In the following, a mode of action of the touch probing device will be described in detail.

The equations for the admissible contact force and collision force between the stylus sphere 38 and the object to be inspected have been described in the literature, e.g. by W. P. van Vliet (already mentioned above):

$$F_y \approx 21 \frac{R^2 Y^3}{E^{*2}} [N], \text{ with} \frac{1}{E^*} = \frac{(1 - V_1^2)}{E_1} + \frac{(1 - v_2^2)}{E_2} \quad [m^2/N] \quad (1)$$

$$F_{col} = \left(\frac{5mv^2}{4\alpha}\right)^{3/5} [N], \text{ with } \alpha = \left(\frac{9}{16 E^{*2} R}\right)^{1/3} [m/N^{2/3}] \quad (2)$$

$$v_y \approx \sqrt{106 \frac{R^3 Y^5}{mE^{*4}}} \quad [m/s] \quad (3)$$

where:
F$_y$ admissible contact force
F$_{col}$ collision force
v$_y$ measuring speed
R Radius of the sphere
Y tensile yield strength
1/E* physico-mechanical factor of the Hertz relations
v$_1$, v$_2$ Poisson's ratios
E$_1$, E$_2$ Young's moduli
m movable mass It is demonstrated by the above equations that probing with small stylus sphere diameters implies a very small admissible dynamic force (collision force) of only a few mN. As already mentioned above, small stylus spheres diameters are however required in order to accurately and non-destructively measure small and fragile parts. It thereby may deduced from the above relations that a user may only directly choose the mass and stiffness, whereas the other parameters are indirectly determined by the measuring task (for example highest possible probing speed). The invention is based upon these findings and suggests a advantageous constitutions by appropriate distribution of the masses and partial stiffness of the components of the touch probing device 2 with help of the shock absorber 10.

Figure 9A:
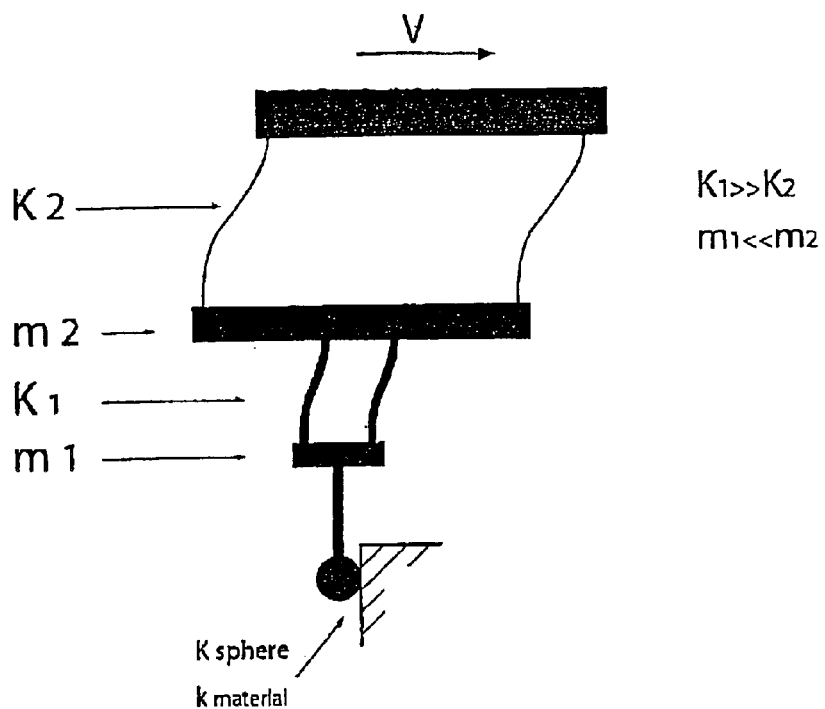
Figure 9B:
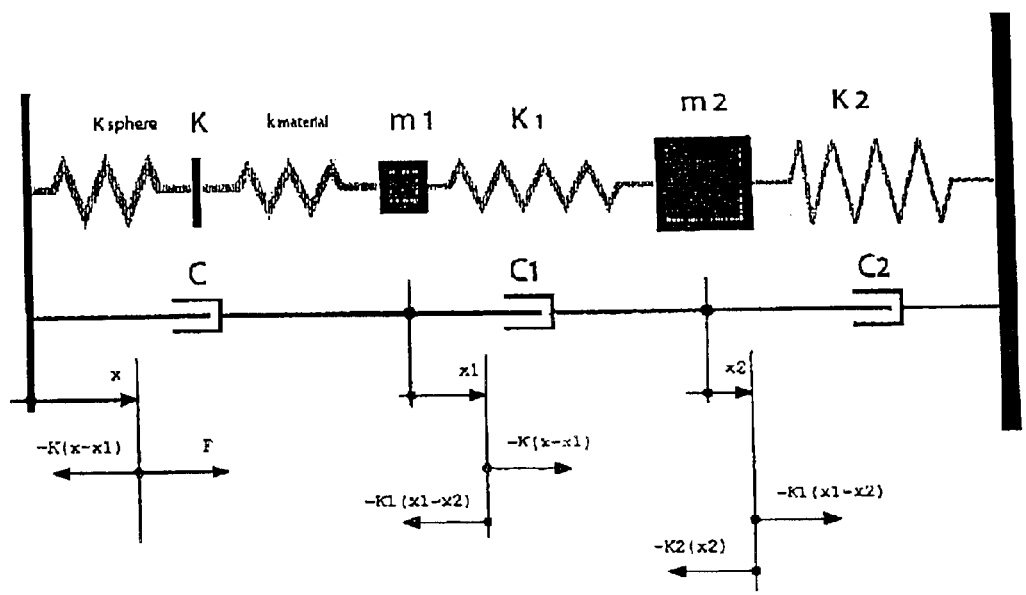

The mode of action of the shock absorber 10 during the touch probing operation will now be described in more detail with reference to FIGS. 9a and 9b and the following equations:

$$m1 \frac{\partial^2 x1}{\partial t^2} = k(x - x1) - k1(x1 - x2) + c \frac{\partial(x - x1)}{\partial t} - c1 \frac{\partial(x1 - x2)}{\partial t} \quad (4)$$

$$m2 \frac{\partial^2 x2}{\partial t^2} = k1(x1 - x2) - k2 x2 + c1 \frac{\partial(x1 - x2)}{\partial t} - c2 \frac{\partial x2}{\partial t} \quad (5)$$

where:
m2 is the movable mass of the motion transmission assembly 4, and the mass of shock absorber fixture 30,
m1 is the sum of the movable masses of the shock absorber 10, the stylus holder 34, the stylus 36 and the stylus sphere 38,
K1 is the stiffness of the shock absorber, in particular its spring unit 32,
K2 is the stiffness of the motion transmission assembly, in particular its flexural links 26 and 28,
K$_{sphere}$ is the stiffness of the stylus sphere,
K$_{material}$ is the stiffness of the object to be inspected.
K is the composite stiffness of the stylus sphere 38 and the object to be inspected, and
C, C1, C2 are the damping coefficients or attenuations of each section (negligible).

The motion transmission assembly 4, the shock absorber 10, the stylus 36 and the object to be inspected are arranged in series. They can be represented by a series of springs and masses. The arrangement has a spring constant corresponding to the reciprocal value or the sum of the reciprocals for the individual spring stiffness. The components are in a stress relieved rest position, whereby the transmission units 16 of the motion transmission assembly 4 are in a center position. The gravity effect of the movable mass is compensated by the static magnetic field generated by the permanent magnets 60 and 62.

The stylus sphere 38 with a sphere diameter in the order of 0.1 mm-0.3 mm is driven onto the surface to be inspected with a specific approaching speed of about 1 mm/s. When the stylus sphere 38 touches the surface of the object, the shock absorber 10 and the motion transmission assembly 4 begin an excursion. Each section of the touch probing device 2 deflects proportionate to its stiffness, its mass m and its attenuation C. The stiffness of the shock absorber 10 is preferably two orders of magnitude higher than the stiffness of the motion transmission assembly 4. Consequently, the excursion of the movable part of the shock absorber 10 (stylus 36, stylus holder 34, etc.) is only a small fraction of about 1% in relation to the excursion of the motion transmission assembly 4 due to the relatively high stiffness of the shock absorber 10 in relation to the one of the remaining transmission chain. Consequently, the substantial fraction of the excursion is made by the motion transmission assembly 4 and directly perceived by the transducers 6. The movable part of the shock absorber 10, however, has a only a very small mass in comparison with the movable mass of the motion transmission assembly 4, preferably about 50 mg. Thus, the dynamic force caused by the impact between stylus 36 and object to be inspected is very small (cp. equation 2).

The higher movable mass m2 of the motion transmission assembly 4 tends to continue its motion, whereby the spring K1 is deformed. The energy of the motion is stored temporarily as elastic potential energy, and will then be immediately released. The movable mass $m^2$ of the motion transmission assembly 4 is taken along with a short delay, without significant influence on the dynamic probing force due to the very low stiffness of the flexural links. The contact is then detected by the position transducers after a displacement of the motion transmission assembly 4 in the order of 50 μm (the maximum possible stroke of each motion transmission unit 16 is in the order of 1 mm). The displacements in the main axis directions are obtained by a suitable coordinate transformation of the displacements sensed by the transducers 6 of each motion transmission unit 16.

Figure 10A:
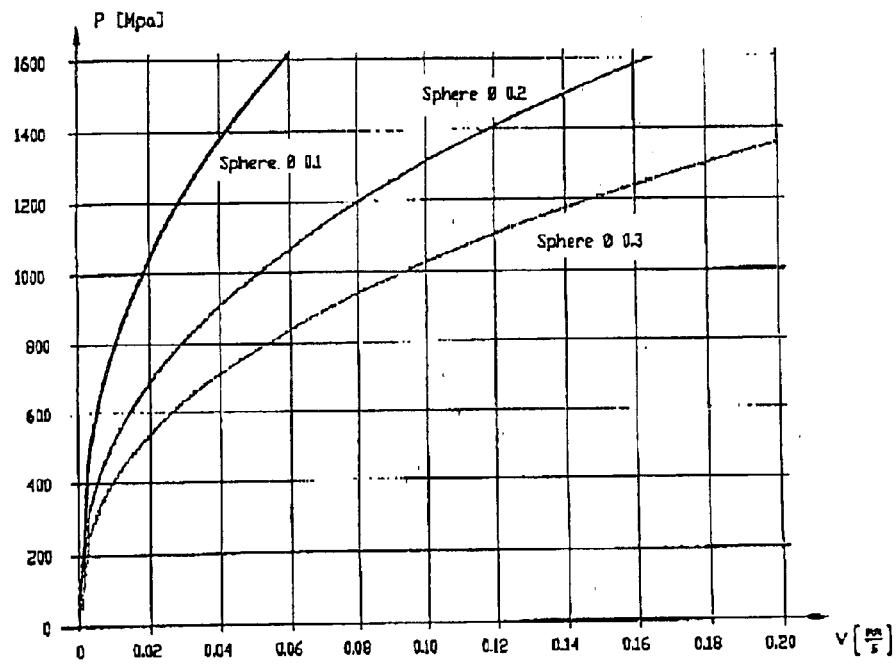
Figure 10B:
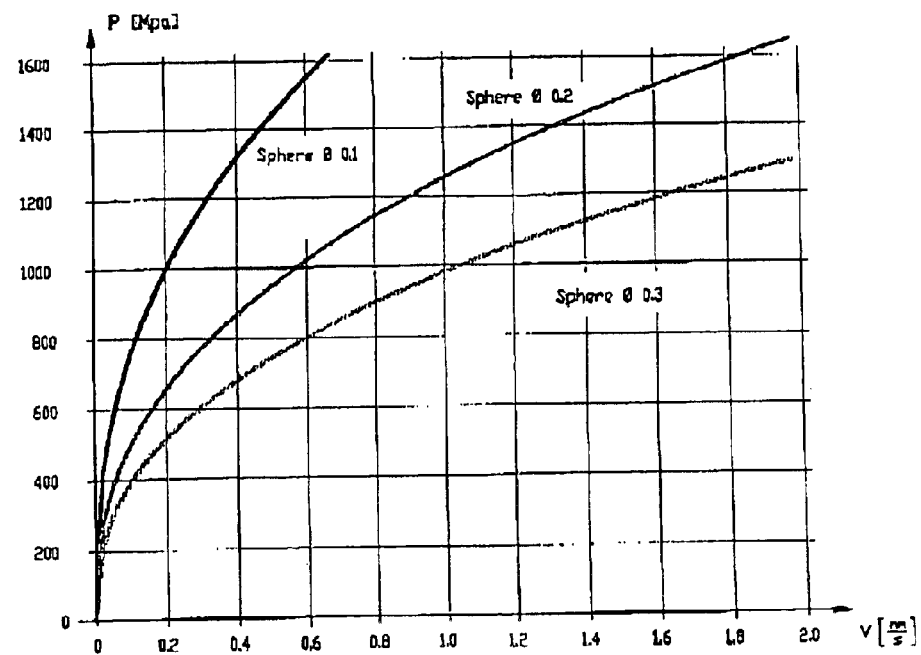

A benefit of the invention becomes apparent by comparing the chart shown in FIG. 10a with the chart shown in FIG. 10b. The charts represent the impact pressure in function of the approaching speed for stylus spheres 38 with diameters 0.1 mm, 0.2 mm, and 0.3 mm, respectively. Without the shock absorber 10 the approaching speed must be kept at a dissatisfying level in order to avoid damages. The use of the shock absorber 10 allows one to approach the object with an acceptable speed. When probing small components the speed of 1–2 mm/s is sufficient. A higher speed obviously leads to shorter measuring cycles.

Although the invention has been described herein with respect to specific embodiments thereof, the appended claims are not to be construed as limited to those embodiments, butt rather to include any modifications an variations of the invention which may occur to one of ordinary skill in the art which fairly fall within its scope.

What is claimed is:

1. A touch probing device for inspecting an object, comprising:
    a fixed part,
    a first movable part coupled to and movable with respect to the fixed part,
    measuring means for measuring the displacement of the fixed part relative to the first movable part and for supplying a measuring signal indicative of the relative displacement, and
    contact means coupled to the movable part for contacting a surface of an object,
    wherein
    the contact means is coupled to the first movable part via a shock absorber.

2. The touch probing device of claim 1, further comprising weight compensating means for compensating the weight of the first movable part, by use of a magnetic field.

3. The touch probing device of claim 2, wherein the weight compensating means comprises a series of permanent magnets arranged to exert a substantially constant magnetic force onto the first movable part.

4. The touch probing device of claim 2, comprising a further weight compensating means.

5. The touch probing device of claim 4, wherein the further weight compensating means comprises tension springs or counterweights.

6. The touch probing device of claim 1, wherein the shock absorber includes a second movable part and the first movable part has a higher mass and a lower stiffness than the second movable part of the shock absorber and the contact means.

7. The touch probing device of claim 6, wherein the first movable part has a mass at least two orders higher than the total mass of the second movable part of the shock absorber and the contact means.

8. The touch probing device of claim 7, wherein the first movable part has a stiffness about two orders lower than the total stiffness of the second movable part of the shock absorber and the contact means.

9. The touch probing device of claim 1, comprising a parallel kinematics motion transmission assembly coupling the fixed part with the first movable part, which assembly is designed to offer three translation degrees of freedom.

10. The touch probing device of claim 9, wherein the motion transmission assembly exhibits uniform stiffness in all spatial directions.

11. The touch probing device of claim 9, wherein the motion transmission assembly comprises three separate transmission units coupling the fixed part with the first movable part, which units are each designed to offer three translational degrees of freedom and to prevent one rotational degree of freedom.

12. The touch probing device of claim 11, wherein each transmission unit comprises a measuring means.

13. The touch probing device of claim 11, wherein each transmission unit comprises flexural links.

14. The touch probing device of claim 11, wherein each transmission unit comprises weight compensating means.

15. The touch probing device of claim 1, wherein the shock absorber exhibits uniform stiffness in all spatial directions.

16. The touch probing device of claim 1, wherein the shock absorber comprises at least one leaf-spring element which prevents one rotational degree of freedom and two translational degrees of freedom.

17. A coordinate measuring machine comprising the touch probing device of claim 1.

18. A touch probing device for inspecting an object, comprising
    a fixed part,
    a movable part coupled to the fixed part in such that it allows for a motion of the movable part with respect to the fixed part,
    measuring means for measuring the displacement of the fixed relative to the movable part and for supplying a measuring signal indicative of the relative displacement,
    contact means coupled to the movable part for contacting a surface of the object, and
    weight compensating means for compensating the weight of the movable part,
    wherein
    the weight compensating means uses a magnetic field for compensating the weight of the movable part, wherein the magnetic field generates a quasi-linear compensating force with an excursion range of the movable part relative to the fixed part.

19. The touch probing device claim 18, comprising a parallel kinematics motion transmission assembly coupling the fixed part with the movable part, which assembly is designed to offer three translation degrees of freedom.

20. The touch probing device of claim 19, wherein the motion transmission assembly comprises three separate transmission units coupling the fixed part with the movable part, which units are each designed to offer three translational degrees of freedom and to prevent one rotational degree of freedom.

21. The touch probing device of claim 20, wherein each transmission unit comprises a measuring means.

22. The touch probing device of claim 20, wherein each transmission unit comprises flexural links.

23. The touch probing device of claim 20, wherein each transmission unit comprises weight compensating means.

24. The touch probing device claim 19, wherein the motion transmission assembly exhibits uniform stiffness in all spatial directions.

25. The touch probing device of claim 18, wherein the weight compensating means comprises a series of permanent magnets arranged to exert a substantially constant magnetic force onto the movable part.

26. The touch probing device of claim 18, comprising a further weight compensating means.

27. The touch probing device of claim 26, wherein the further weight compensating means comprises tension springs or counterweights.

28. A coordinate measuring machine comprising the touch probing device of claim 18.

* * * * *

UNITED STATES PATENT AND TRADEMARK OFFICE
CERTIFICATE OF CORRECTION

PATENT NO. : 6,886,265 B2
APPLICATION NO. : 10/662604
DATED : May 3, 2005
INVENTOR(S) : Fracheboud et al.

Page 1 of 1

It is certified that error appears in the above-identified patent and that said Letters Patent is hereby corrected as shown below:

\*\*On the title page of the patent in the Assignee item (73), change "Mercartex SA" to --Mecartex SA--\*\*

Signed and Sealed this

Fourth Day of March, 2008

JON W. DUDAS
*Director of the United States Patent and Trademark Office*